US006457068B1

(12) United States Patent
Nayyar et al.

(10) Patent No.: US 6,457,068 B1
(45) Date of Patent: Sep. 24, 2002

(54) GRAPHICS ADDRESS RELOCATION TABLE (GART) STORED ENTIRELY IN A LOCAL MEMORY OF AN EXPANSION BRIDGE FOR ADDRESS TRANSLATION

(75) Inventors: Raman Nayyar, Hillsboro; Douglas R. Moran, Beaverton; Leonard W. Cross, Portland, all of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/385,209

(22) Filed: Aug. 30, 1999

(51) Int. Cl.$^7$ .............. G06F 3/00; G06F 12/00; G06F 12/02
(52) U.S. Cl. ............. 710/3; 711/202; 711/203
(58) Field of Search .................. 711/149, 154, 711/202, 203; 710/3, 56; 345/501, 520

(56) References Cited

U.S. PATENT DOCUMENTS

| | | | |
|---|---|---|---|
| 4,945,499 A | | 7/1990 | Asari et al. ............. 364/521 |
| 5,335,329 A | | 8/1994 | Cox et al. |
| 5,479,627 A | * | 12/1995 | Khalidi et al. ............. 711/205 |
| 5,606,683 A | * | 2/1997 | Riordan ............. 711/207 |
| 5,905,509 A | * | 5/1999 | Jones et al. ............. 345/520 |
| 5,937,436 A | * | 8/1999 | Watkins ............. 711/202 |
| 5,949,436 A | * | 9/1999 | Horan et al. ............. 345/501 |
| 5,983,332 A | * | 11/1999 | Watkins ............. 711/202 |
| 5,999,743 A | * | 12/1999 | Horan et al. ............. 395/876 |
| 6,029,224 A | * | 2/2000 | Asthana et al. ............. 711/5 |
| 6,049,857 A | * | 4/2000 | Watkins ............. 711/207 |
| 6,130,680 A | * | 10/2000 | Cox et al. ............. 345/511 |
| 6,141,701 A | * | 10/2000 | Whitney ............. 710/5 |
| 6,145,030 A | * | 11/2000 | Martwick ............. 710/36 |
| 6,192,455 B1 | * | 2/2001 | Bogin et al. ............. 711/154 |
| 6,199,145 B1 | * | 3/2001 | Ajanovic et al. ............. 711/149 |

FOREIGN PATENT DOCUMENTS

| | | |
|---|---|---|
| EP | 0 392 657 | 6/1990 |
| WO | WO 94/16391 | 7/1994 |
| WO | WO 98/11490 | 3/1998 |

OTHER PUBLICATIONS

Intel Corporation, "Intel 440GX AGPset Product Overview", downloaded from Website http://developer.intel.com/design/chipsets/440gx on Nov. 16, 1999, 3 pages.
Intel Corporation, "Intel 440GX AGPset: 82443GX Host Bridge/Controller Datasheet", Jun. 1998, title page through page 1–3 and pp. 4–1 through 4–10.
Intel Corporation, "Accelerated Graphics Port Interface Specification, Revision 2.0", May 4, 1998, pp. 1–43 and 243–259.

* cited by examiner

*Primary Examiner*—Thomas Lee
*Assistant Examiner*—Chun Cao
(74) *Attorney, Agent, or Firm*—Blakely, Sokoloff, Taylor & Zafman LLP (57) ABSTRACT

A method and apparatus are provided for performing address translation in an input/output (I/O) expansion bridge. The I/O expansion bridge includes a first interface unit, a second interface unit, and an address translation unit. The first interface unit is configured to be coupled to a system memory and I/O controller through one or more I/O ports. The first interface unit enables data transfers over the one or more I/O ports to or from the main memory of a computer system. The second interface unit provides bus control signals and addresses to enable data transfers over a bus to or from a peripheral device. The address translation unit is coupled to the first interface unit and the second interface unit. The address translation unit translates addresses associated with transactions received on the second interface by accessing a local memory containing physical addresses of pages in the main memory of the computer system.

18 Claims, 12 Drawing Sheets

GRAPHICS ADDRESS RELOCATION TABLE (GART) STORED ENTIRELY IN A LOCAL MEMORY OF AN EXPANSION BRIDGE FOR ADDRESS TRANSLATION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to bus protocol bridging. More particularly, the invention relates to input/output (I/O) address translation, such as remapping a continuous logical address space to a potentially discontinuous physical address space, in a bridge.

2. Description of the Related Art

Input/output (I/O) peripheral devices typically operate more efficiently if they are presented with a large contiguous view of system memory (main memory). This allows such devices to make random accesses into a large area of memory containing the data in which they are interested. A contiguous view of memory is especially important for graphics cards which must often retrieve an entire texture map in order to render a scene on a display device. For purposes of this application, the address space in which the I/O peripheral device operates that gives the perception of a large contiguous address space is called a "virtual address space."

At any rate, because the peripheral device employs a different address space than the main memory of the host computer system, a process called "address translation" is required to map the virtual addresses supplied by the peripheral device to the corresponding potentially discontinuous physical addresses in main memory.

Figure 1:
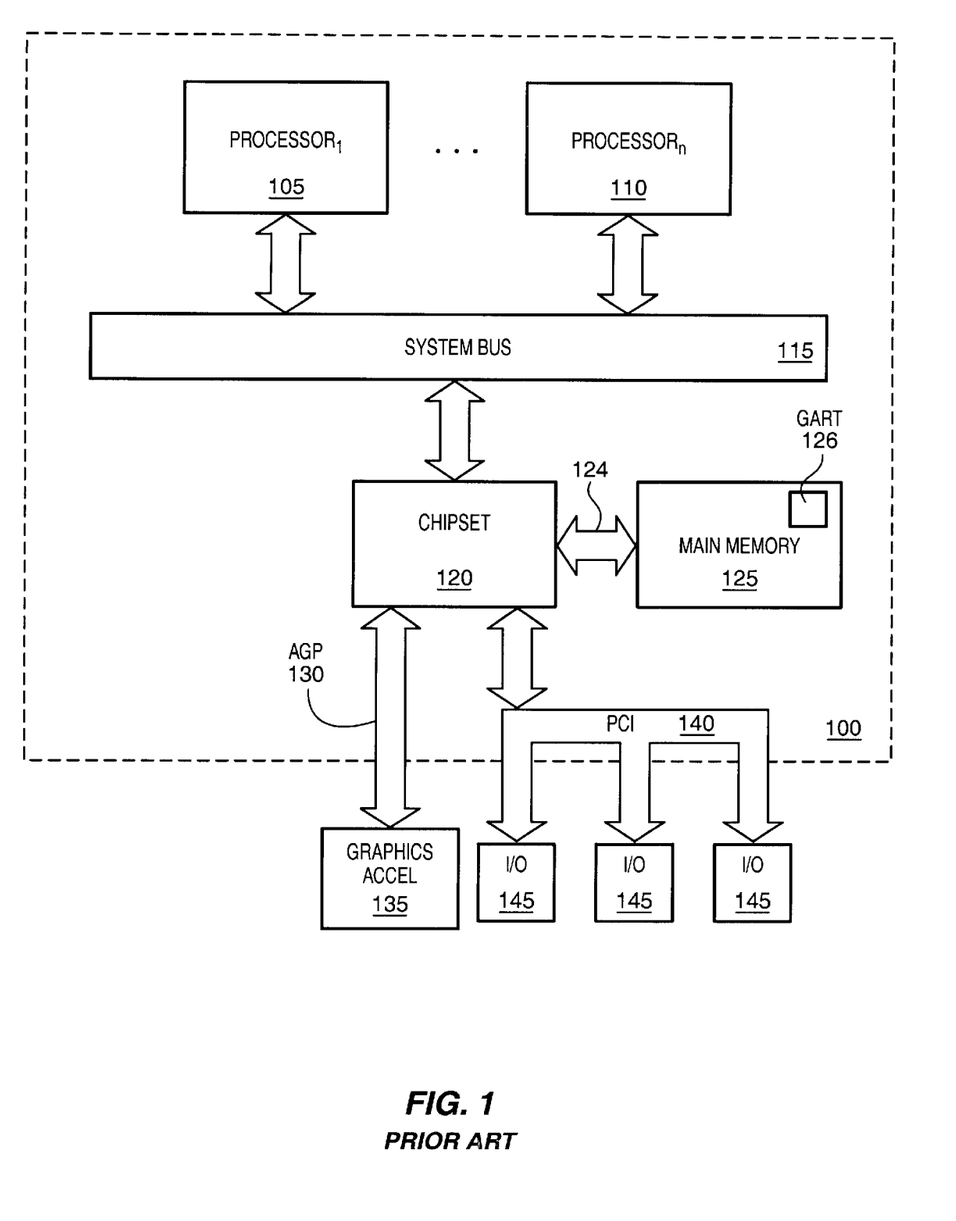
FIG. 1 is a block diagram that illustrates a prior art approach for graphics address translation.

An example of a current technique for address translation will now be described with reference to FIG. 1. FIG. 1 is a high-level block diagram of a general purpose computer system 100 that illustrates translation of graphics addresses to physical addresses. The computer system 100 includes processing means, such as one or more processors 105 and 110, a chipset 120, a main memory 125, a memory bus 124, an Accelerated Graphics Port (AGP) bus 130, and a PCI bus 140. In this example, the main memory includes a graphics address relocation table (GART) which contains entries for mapping virtual addresses used by a peripheral device, such as graphics accelerator 135, to physical addresses in main memory 125.

The chipset 120 provides bridging functions between the AGP bus 130, the PCI bus 140, and the memory bus 124. As part of the bridging function, the chipset 120 translates graphics addresses contained in inbound read and write transactions (e.g., read and write transactions originated by the graphics accelerator 135) to corresponding physical addresses in main memory 125 using the GART 126. Consequently, in a computer system configured in accordance with FIG. 1, processing of graphics data, such as texture maps, requires multiple accesses to main memory 125. First, the chipset 120 must retrieve an entry from the GART 126 that corresponds to the graphics address specified in the transaction being executed. Then, after the desired physical address has been determined by the chipset 120, the chipset 120 must perform a second access to main memory 125 in order to read or write the data specified by the transaction.

One of the great advantages of AGP is that it isolates the video subsystem from the rest of the computer system so there isn't nearly as much contention over I/O bandwidth as there is with PCI. However, from the description above, it should be apparent that there are a number of inefficiencies associated with the way translation of AGP transactions are currently handled. First, accesses to main memory 125, which is typically made up of dynamic random access memories (DRAMs), are relatively slow compared to accesses to static random access memory (SRAM), for example. Second, the main memory 125 accesses for purposes of address translation must compete with other access requests, such as those originated by processor 105 or 110 and received over the system bus 115 or those received on the PCI bus 140. As a result, AGP translations are slowed down by competing traffic. Finally, if the translation unit (not shown) handles multiple types of traffic, e.g., system bus traffic, PCI traffic, and AGP traffic, the situation is further complicated as arbitration logic becomes necessary to resolve contention for the translation unit among the various types of inbound and outbound transactions.

It would be desirable, therefore, to provide a technique for translating I/O addresses that speeds up the execution of I/O transactions and offers a simplified implementation of the address translation logic. In addition, it would be advantageous to perform the necessary I/O address translation in a device that is insulated from other types of traffic, such as system bus traffic or traffic from other I/O devices.

BRIEF SUMMARY OF THE INVENTION

A method and apparatus are described for performing address translation in an input/output (I/O) expansion bridge. The I/O expansion bridge includes a first interface unit, a second interface unit, and an address translation unit. The first interface unit is configured to be coupled to a system memory and I/O controller through one or more I/O ports. The first interface unit enables data transfers over the one or more I/O ports to or from the main memory of a computer system. The second interface unit provides bus control signals and addresses to enable data transfers over a bus to or from a peripheral device. The address translation unit is coupled to the first interface unit and the second interface unit. The address translation unit translates addresses associated with transactions received on the second interface by accessing a local memory containing physical addresses of pages in the main memory of the computer system.

Other features and advantages of the invention will be apparent from the accompanying drawings and from the detailed description.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus are described for performing address translation in an I/O expansion bridge. Broadly stated, embodiments of the present invention seek to provide a technique for translating I/O addresses that speeds up the execution of I/O transactions by, among other things, insulating the I/O translation device, e.g., an I/O expansion bridge, from other types of traffic, such as system bus transactions. According to one feature of the present invention, the GART may be stored in a local SRAM rather than across the memory bus. Advantageously, since the interface is local and accesses to fetch GART entries do not have to compete with other types of traffic, transactions can be completed faster and the implementation of the translation device can be simplified.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

Importantly, while embodiments of the present invention will be described with reference to the Accelerated Graphics Port (AGP) and a graphics address relocation table (GART) locally accessible to a graphics expansion bridge (GXB) for translating various AGP and PCI-like transactions, the method and apparatus described herein are equally applicable to other types of I/O transactions and I/O expansion bridges or other types of buses where the device on the I/O bus needs a contiguous view of main memory. For example, the techniques described herein are thought to be useful in connection with transactions involving the VESA Local Bus (VLB) and/or the Peripheral Component Interconnect (PCI) Bus.

Terminology

Before describing an exemplary environment in which various embodiments of the present invention may be implemented, some terms that will be used throughout this application will briefly be defined.

The term "bus" generally refers to the physical communication medium or channel over which information flows between two or more devices. While a bus with only two devices on it is considered by some to be a "port," as used herein, the term bus is intended to encompass such ports as well.

The terms "processor bus," "system bus," or "host bus" typically refer to the highest-level bus in the hierarchy of buses of a computer system. This bus is typically used by a system chipset to send information to and from the one or more processors of the computer system.

"Memory bus" refers to the bus that connects the memory subsystem to the system chipset and the processor(s). Importantly, in some computer systems, the processor bus and the memory bus may be the same bus.

A "local I/O bus" is typically a high-speed input/output (I/O) bus used for connecting various types of peripheral devices to the memory, the system chipset and/or the processor(s) of the computer system. For example, video cards, disk storage devices, high-speed network interfaces, and other performance-critical peripherals are commonly coupled to a bus of this kind. Common local I/O buses include the VESA Local Bus (VLB), the Peripheral Component Interconnect (PCI) Bus, and the Accelerated Graphics Port (AGP) Bus. Again, for purposes of this disclosure, a bus designed to be shared by more than two devices and a port designed for use by only two devices, such as an I/O port or AGP, are both considered to be buses.

"Accelerated Graphics Port" (AGP) is a high-performance bus specification, as described in the *Accelerated Graphics Port Interface Specification,* Revision 2.0, May 4, 1998 and subsequent revisions thereto, that is designed for fast, high-quality display of 3D graphics and video images.

A "PCI transaction" generally refers to a PCI transaction with AGP semantics that is issued on the AGP bus.

As used herein, a "bridge" generally refers to the logic and circuitry embodied in a chipset, for example, to connect two buses and allow the device(s) on one bus to communicate with the device(s) on the other and vice versa. By way of example, one common bridge found in computer systems is a PCI-ISA bridge, which is typically part of the system chipset. The PCI bus also may also have a bridge to the processor bus, called a PCI expansion bridge (PXB).

In the context of this application, a "transaction" comprises one or more of a request (address) phase and a data phase. A transaction typically includes a start address, a transaction type, and an indication of the amount of data to be transferred.

The direction of a particular transaction is determined from the perspective of the processor(s). Therefore, an "inbound transaction" generally refers to a read or write request directed to the computer system by a peripheral device, such as a video card, disk storage device, or high-speed network interface; and an "outbound transaction" generally refers to a read or write request directed to a peripheral device by the computer system.

Input/Output Address Translation

Figure 2:
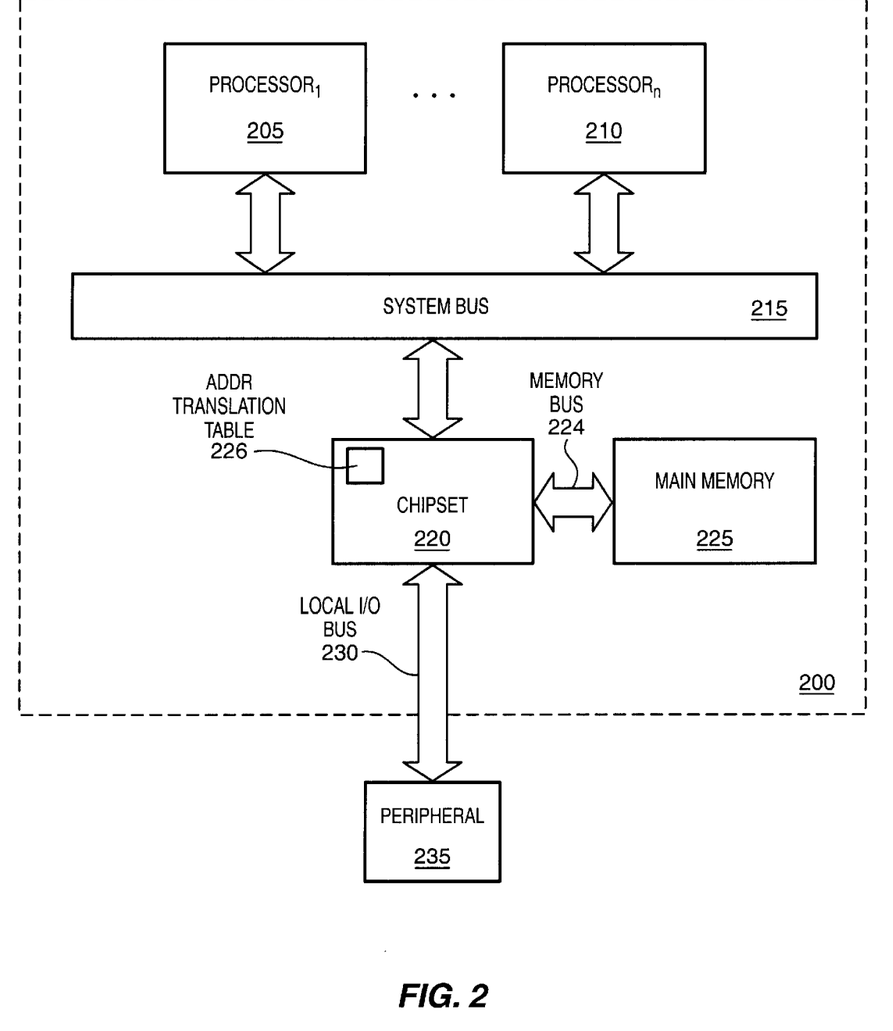
FIG. 2 is a block diagram that illustrates input/output address translation according to one embodiment of the present invention.

Various features of the present invention are thought to be generally useful in connection with performing address translation in an I/O expansion bridge. In order to put this broad aspect of the present invention in context, an exemplary computer system architecture in which one embodiment of the present invention may be implemented will now be described with reference to FIG. 2. FIG. 2 illustrates a general purpose computer system 200 in which one or more of the steps of a method according to one embodiment of the present invention may be performed and in which an apparatus according to one embodiment of the present invention may reside. The computer system 200 includes a processing means, such as one or more processors 205 and 210, a chipset 220, a main memory 225, a memory bus 224, and a local I/O bus 230. According to this embodiment, the chipset 220 includes an address translation table 226. The address translation table contains entries (not shown) which facilitate the translation of virtual addresses received from a peripheral device 235 to physical addresses in main memory 225. As described further below, the chipset 220 may include one or more integrated circuits upon which various chipset functions, e.g., system bus arbitration, I/O address translation, etc., may be distributed. In this example, the chipset 220 acts as a bridge between the both the local I/O bus 230 and the system bus 215 and the memory bus 224. As part of its bridging operations, the chipset 220 accesses the local address translation table 226 to map the continuous I/O address space employed by the peripheral device 235 to the physical address space of the main memory 225. Importantly, as will be explained further below, by locating the address translation table 226 local to the chipset 220 (e.g., in a dedicated on-chip or off-chip SRAM), inbound transactions from the peripheral device 235 may be more efficiently executed.

Graphics Address Translation

Figure 3:
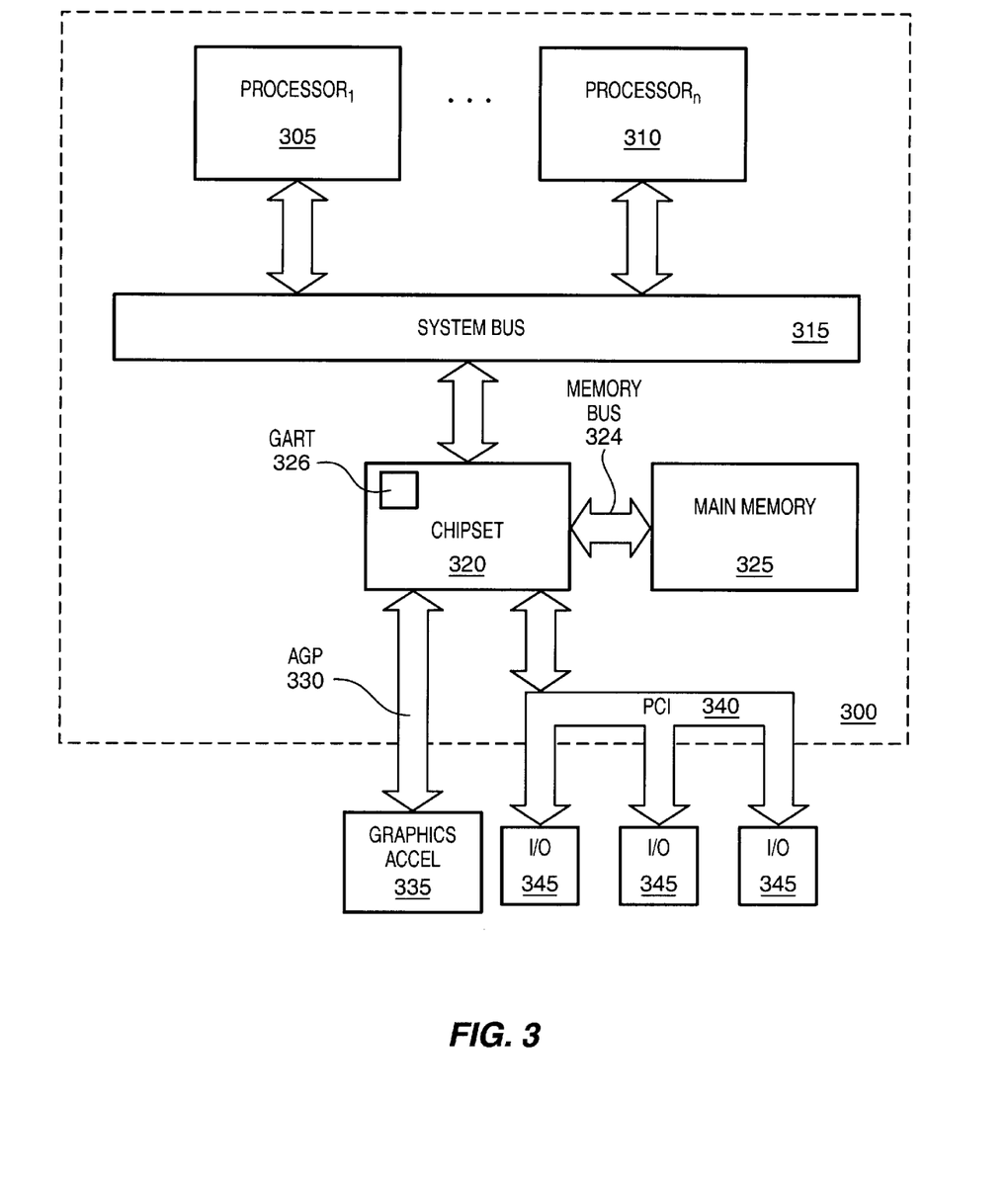
FIG. 3 is a block diagram that illustrates graphics address translation according to one embodiment of the present invention.

Various features of the present invention are thought to be particularly useful for performing address translation from a graphics address space, such as that employed by AGP-compatible graphics devices, to the physical address space of main memory 225. FIG. 3 is a high-level block diagram illustrating a general purpose computer system 300 in which an improved virtual address translation technique according to one embodiment of the present invention may be implemented. The computer system 300 includes processing means, such as one or more processors 305 and 310, a chipset 320, a main memory 225, a memory bus 324, an Accelerated Graphics Port (AGP) bus 330, and a PCI bus 340. In the embodiment depicted, the chipset 320 includes a graphics address relocation table (GART) 326. The GART 326 contains GART entries (described below) which contain information for accomplishing the translation of virtual addresses received from a graphics accelerator 335 to physical addresses of the main memory 325.

According to this embodiment, the GART 326 is locally accessible to the chipset 320 rather than being located across the memory bus 324 in main memory 325. The chipset 320 provides a bridging function between the AGP bus 330, the PCI bus 340, and the memory bus 324. As part of the bridging function, the chipset 320 translates graphics addresses contained in inbound read and write transactions (e.g., read and write transactions originated by the graphics accelerator 335) to corresponding physical addresses in main memory 325 using the local GART 326. As described above, with reference to FIG. 2, by locating the GART 326 in the chipset 320, inbound transactions from peripheral devices, such as the graphics accelerator 335 may be more efficiently processed and executed. Importantly, rather than the roughly 300 to 500 nano seconds which might be required to get to fetch data from main memory 325 (e.g., DRAM), a fetch from the local SRAM can be performed in approximately 30 nano seconds or less.

Exemplary Chipset

Figure 4:
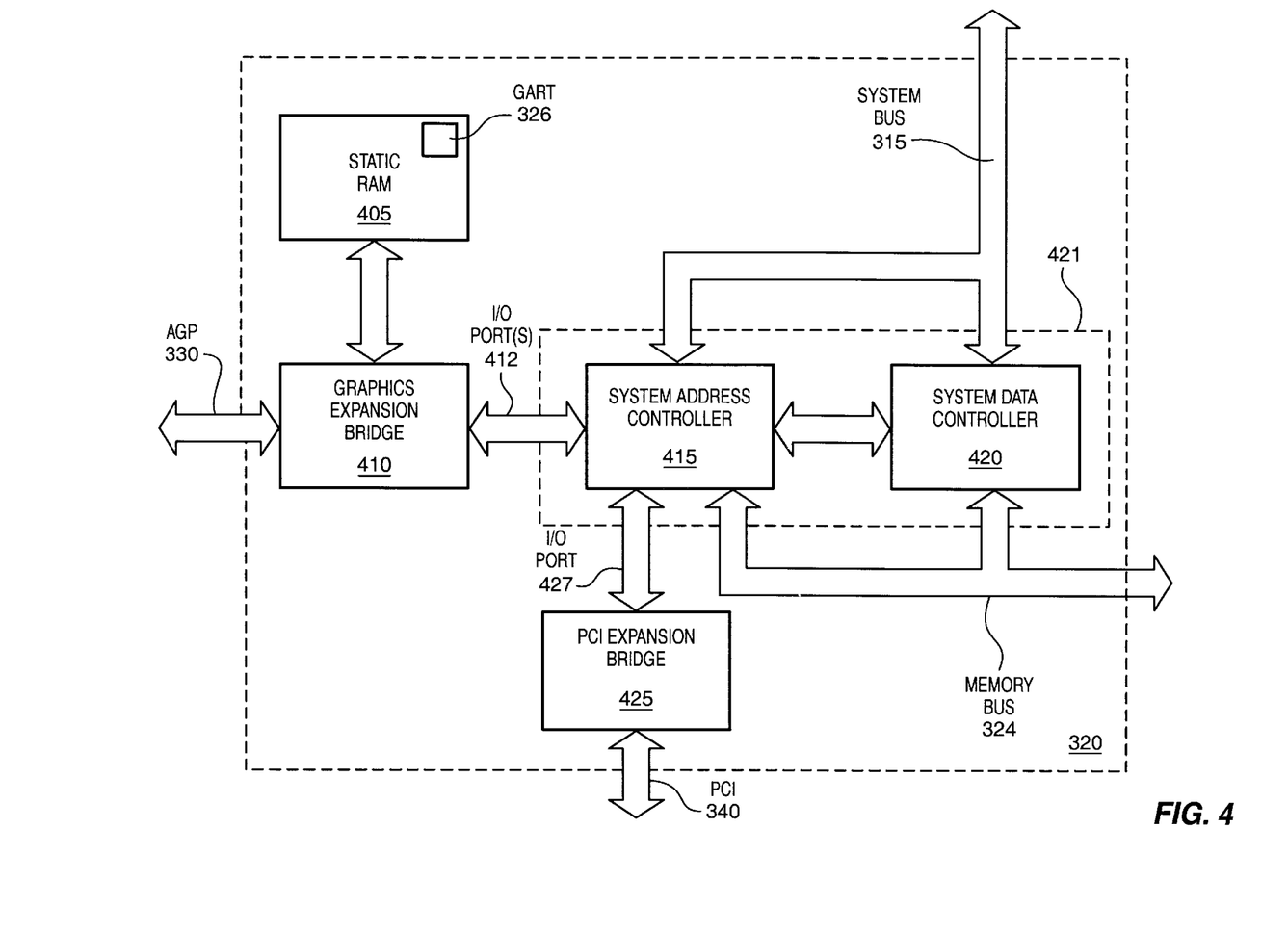
FIG. 4 is a block diagram illustrating an exemplary chipset in which embodiments of the present invention may be implemented.

Having briefly described exemplary environments in which the present invention may be employed, an exemplary chipset implementation will now be described with reference to FIG. 4. FIG. 4 illustrates an exemplary allocation of functionality among a plurality of units (e.g., chips) according to one embodiment of the present invention. In this example, the chipset 320 includes a system address controller (SAC) 415, a system data controller (SDC) 420, a PCI expansion bridge (PXB) 425, graphics expansion bridge (GXB) 410, and static RAM (SRAM) 405.

The SAC 415 connects to the address and control sections (not shown) of the system bus 315. The SAC 415 is responsible for translating and directing system bus 315 accesses to the appropriate I/O port or main memory 325. It also acts as a routing agent for inbound traffic, directing it to a peer I/O port 412 or 427, main memory 325 or the system bus 315.

The SDC 420 connects to the data signals (not shown) on the system bus 315, and also to main memory 325 by way of the memory bus 324 and the SAC 415. The data for all transfers passes through the SDC 420, whether from the system bus 315 to main memory 325, from one of the I/O ports 412 or 427 to memory or peer to peer I/O port 412 or 427. The connection between the SAC 415 and SDC 420 allows for concurrent data transfers to the system bus 315 and to the I/O ports 412 or 427 thereby maximizing the available bandwidth to each system agent. In alternative embodiments, the functionality of the SAC 415 and the SDC 420 may be combined into a single system memory and I/O controller 421 or distributed over additional integrated circuits.

The PXB 425 provides a bus protocol bridging function between the I/O port 427, such as an F16 bus, and the PCI bus 340. A single PXB 425 typically connects to one I/O port 427 and creates two 33 Mhz, 32-bit PCI buses. Alternatively, the PXB 425 may support a single 64-bit PCI bus. A computer system may include multiple PXBs (typically 1 to 4).

The GXB 410 creates a bridge between the I/O ports 412, e.g., two F16 buses, and the AGP bus 330 by providing a bus protocol bridging function between the P/O ports 412 and the AGP bus 330. In this manner, the GXB 410 adds a high performance, dedicated graphics port to the computer system. Multiple GXBs can be instantiated in a computer system to create a multi-graphics port workstation. The primary function of the GXB 410 is to create a bridge between the I/O ports 412 and the AGP bus 330. Briefly, the GXB 410 does this by accepting outbound transactions from the I/O ports 412, storing them internally, and then delivering them on the AGP bus 330 using the appropriate signaling protocol. Conversely, the GXB 410 accepts inbound transactions issued on the AGP bus 330, again stores them internally, translates the graphics addresses associated with the inbound transactions, and issues the translated inbound transactions onto the I/O port(s) 412. As will be described in further detail below, the GXB 410 performs address translation by accessing the GART 326 stored in an on or off-chip SRAM 405. Several advantages are achieved by the chipset architecture of FIG. 4. First, the GXB 410 is isolated from the system bus 315 and associated system traffic thereby eliminating a source of contention for the resources of the GXB 410 and doing away with the need for associated arbitration logic. Second, since the GART 326 resides in the GXB 410, address translation processing will not interfere with main memory traffic and the memory bus 324 is more efficiently utilized. Additionally, the local SRAM accesses to the GART 326 are approximately ten times faster than if the GXB 410 had to go over the memory bus 324. Consequently, the end result is an improved protocol bridge for servicing transactions on the AGP bus 330. The improved protocol bridge is simpler, faster, and more efficient than the current bridging techniques described above. Exemplary internal partitionings of the GXB 410 will be described below.

Importantly, in view of the recent wave of integration, it is contemplated that one or more of the GXB 410 components could be integrated onto a single integrated circuit (IC). Additionally, in alternative embodiments, one or more of the GXB 410 components could be integrated with a processor and/or memory onto a single integrated circuit.

Graphics Expansion Bridge Functional Partitioning

Figure 5A:
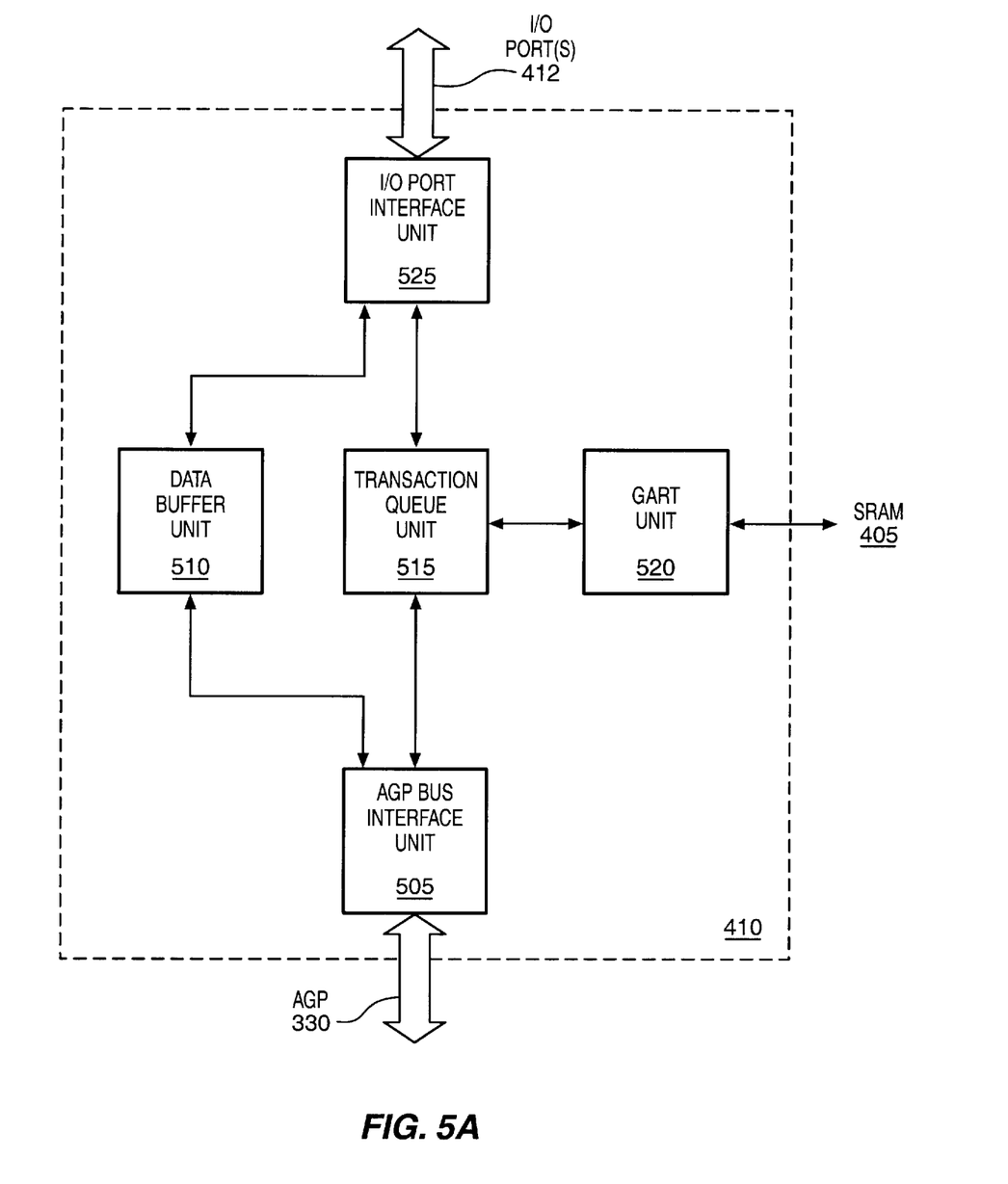
FIG. 5A is a simplified block diagram illustrating high-level interconnection among functional units of a graphics expansion bridge according to one embodiment of the present invention.

An exemplary partitioning of the various functions of the GXB 410 into particular units will now be described with reference to FIG. 5A. FIG. 5A is a simplified block diagram illustrating high-level interconnection among functional units of a graphics expansion bridge according to one embodiment of the present invention. In this example, GXB 410 includes an AGP bus interface unit 505, a data buffer unit 510, a transaction queue unit 515, a GART unit 520, and an I/O port interface unit 525. The AGP bus interface unit 505 may be based upon a 66 Mhz, 32-bit PCI bus. In practice, to ease implementation, the AGP bus interface unit 505 may be further divided into the core PCI bus and the incremental logic that adds the AGP capabilities. On the AGP side, the AGP bus interface unit 505 includes arbitration logic (not shown) for managing AGP bus 330 ownership between inbound and outbound transactions. Additionally, bus control signals and addresses are provided by the AGP bus interface unit 505 to enable AGP data transfers over the AGP bus 330. The AGP bus interface unit 505 may also maintain an internal transaction queue and data buffers (not shown) for performing any necessary intra stream reordering and for holding a transaction until adequate resources are available in the transaction queue unit 515 to service it.

As will be described further below, the transaction queue unit 515 implements one or more internal transaction queues for inbound and outbound transactions. Buffer space may also be implemented in the GXB 410 to support various data buffering needs. For example, the data buffer unit 510 may contain data buffers for temporarily storing data within the GXB 410. The data buffers may be implemented as separate buffers for each transaction type in each direction or as a common buffer.

As described above, in current graphics address translation mechanisms, the GART 126 is stored in main memory 125. Accordingly, in such implementations, GART functionality is performed proximate to main memory 125. In contrast, according to the present embodiment, GART functionality is performed within the GXB 410 by the GART unit 520. According to one embodiment, the GART unit implements a push model and translates transactions whenever a valid transaction resides in one of the transaction queue(s). In this regard, the GART unit 520 is responsible for accepting inbound transactions from the transaction queue(s) and translating the transactions as necessary. In the embodiment depicted, the GART unit 520 is coupled to a local off-chip SRAM 405 that includes the GART 326. Alternatively, the GART 326 may be stored in an on-chip SRAM. The GART unit 520 is also responsible for programming the contents of the SRAM 405. The SRAM 405 should be initialized as invalid or programmed before any accesses commence. The GART unit 520 can be directed to program the SRAM 405 dynamically every time a new application is started, for example. Programming may be achieved by issuing programming access requests from the system bus 315.

The I/O port interface unit 525 provides the interface to one or more I/O ports by enabling requests and data transfers over the one or more I/O ports. For example, according to one embodiment, the I/O port interface unit 525 interfaces two F16 buses. The I/O port interface unit 525 removes transactions from the inbound transaction queue(s) maintained in the transaction queue unit 515 based upon availability and stream priority, and transmits the transactions across the appropriate I/O port 412. If the request is a write, then data is read from the appropriate buffer in the data buffer unit 510 is sent as well. For outbound transactions, an entry is added to the appropriate outbound transaction queue maintained in the transaction queue unit 515. If necessary, data associated with an outbound transaction is delivered to the appropriate buffer in the data buffer unit 510.

For the purposes of this description, transactions and the data related thereto have been partitioned to separate units. However, various other alternative embodiments are contemplated. For example, according to one embodiment, related data buffers and transactions may be grouped together. Therefore, nothing disclosed herein should be construed as limiting the present invention to an embodiment based on a particular partitioning of GXB functionality.

Figure 5B:
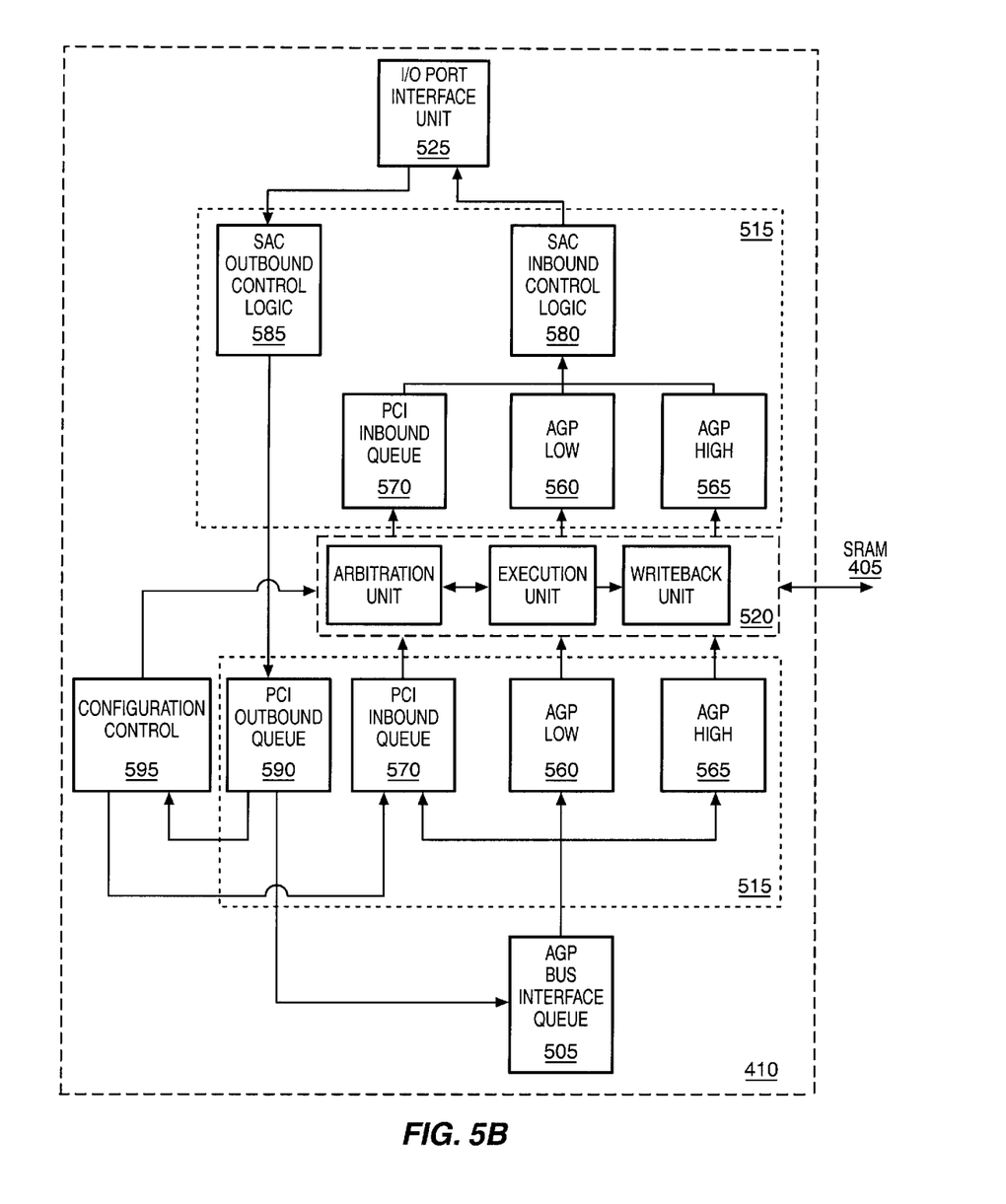
FIG. 5B is a simplified block diagram illustrating a more detailed view of a graphics expansion bridge according to one embodiment of the present invention.

FIG. 5B is a simplified block diagram illustrating a more detailed view of graphics expansion bridge 410 according to one embodiment of the present invention. According to this example, in the spirit of the AGP specification, the high and low AGP and PCI streams are maintained as separate structures up until the I/O port interface unit 525. The transaction queue unit 515 includes an AGP low priority queue 560, an AGP high priority queue 565, a PCI inbound queue 570, SAC inbound control logic 580, SAC outbound control logic 585, and a PCI outbound queue 590. The AGP bus interface unit 505 receives inbound AGP transactions from the AGP bus 330 and adds them to the appropriate queue 560, 565, or 570. For example, inbound PCI transactions from the AGP bus 330 are routed to the PCI inbound queue 570 by the AGP bus interface unit 505.

The SAC outbound control logic 585 receives outbound transactions from the I/O ports 412 and queues them onto the PCI outbound queue 590. The PCI outbound queue 590 in turn is unloaded by the AGP bus interface unit 505. Importantly, because the outbound transactions do not require address translation they do not need to go through the GART unit 520.

According to this embodiment, the GART unit 520 includes an arbitration unit 530, an execution unit 535, and a writeback unit 540. The arbitration unit 530 performs two main functions: (1) arbitration among the AGP and PCI accesses and SRAM accesses (programming accesses) coming from the configuration control unit 595 and (2) generation of SRAM addresses (GART indices). The arbitration function of the arbitration unit 530 involves deciding which transaction of those at the head of the transaction queues 560, 565, and 570 will be translated next. The virtual addresses (which are 40 bits wide in one embodiment) associated with the inbound transactions in the transaction queues 560, 565, and 570 are too wide to be fed directly to the SRAM 405. Therefore, the SRAM address generation function (GART index generation function) of the arbitration unit 530 determines an SRAM address based upon the virtual address of the transaction that won the arbitration. The arbitration unit 530 may then communicate to the execution unit 535 that it should assert the appropriate control signals for the SRAM operation (e.g., read or write). In this manner, the execution unit 535 can immediately issue an SRAM cycle without having to process the address further. Alternatively, the arbitration unit 530 could provide the execution unit 535 with the SRAM address and the execution unit 535 could assemble a full packet and issue it to SRAM 405.

Ideally, the SRAM 405 should be run in pipelined mode and every clock the arbitration unit 530 should be able to provide the address for the next transaction to be translated and communicate the availability of the next transaction to the execution unit 535.

In one embodiment, the execution unit 535 initiates and controls various SRAM operations by asserting and deasserting SRAM control signal at the appropriate times. In an alternative embodiment, the execution unit 535 may perform an execution stage which includes processing an incoming SRAM address from the arbitration unit 530 and executing it by sending it to the SRAM 405. When GART entries are received by the execution unit 535, they are used to perform address translation or discarded. If the inbound transaction address corresponding to the GART entry is within the GART aperture, then the GART entry is used to perform address translation. However, if the inbound transaction address falls outside the GART aperture (e.g., it is a physical address), then the GART entry is dropped and no translation is performed. In an alternative embodiment, the execution unit 535 may hold old translations or use a translation look-aside buffer to facilitate address translation. In any event, the "translated address," e.g., the original inbound transaction address or the physical address is provided to the writeback unit 540.

The writeback unit 540 receives SRAM data and using information provided by the execution unit 535 and the configuration control unit 595 formats the data and routes it to the correct destination (e.g., an entry of a queue in the transaction queue unit 515). For example, according to the embodiment depicted, the writeback unit 540 is responsible for overwriting the virtual addresses of the inbound transactions with the translated address provided by the execution unit.

High-Level Transaction Processing

Figure 6:
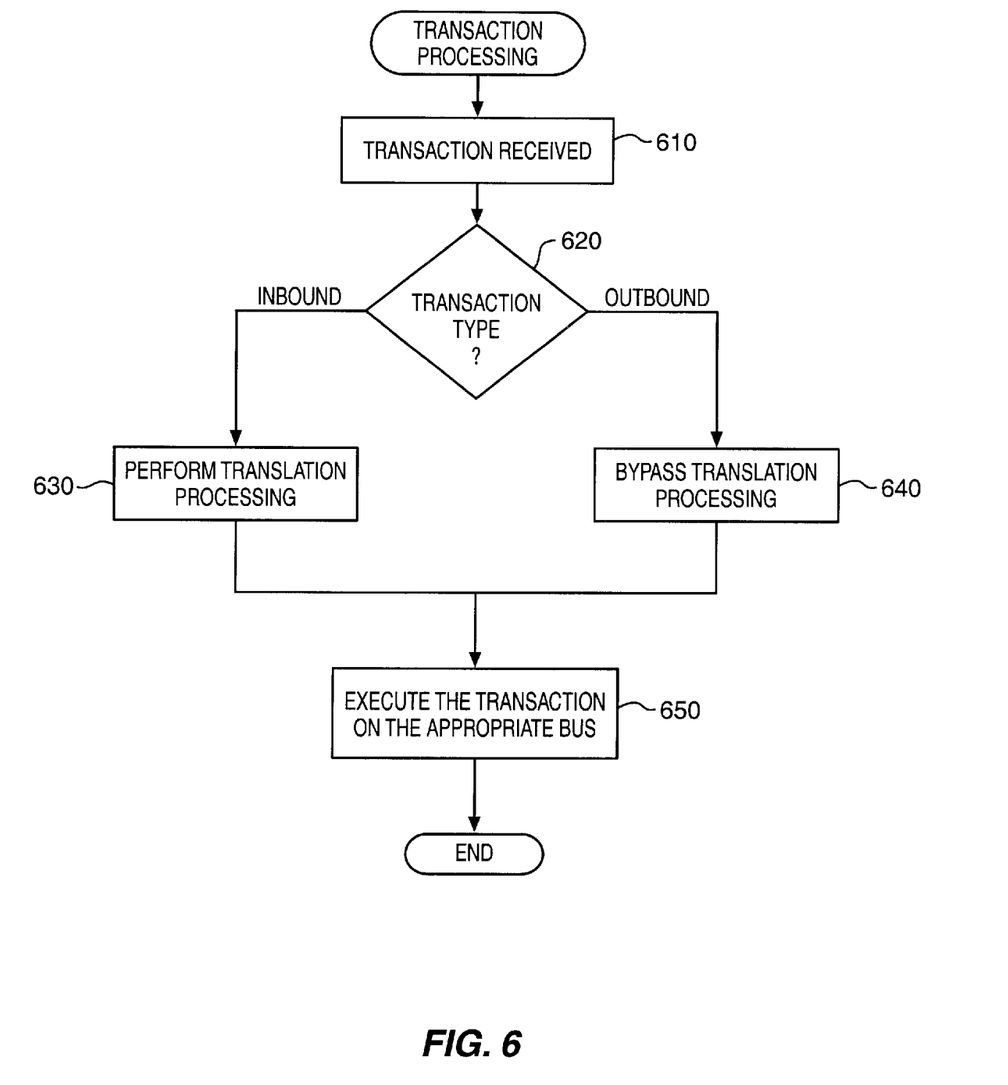
FIG. 6 is a high-level flow diagram conceptually illustrating transaction processing according to one embodiment of the present invention.

FIG. 6 is a high-level flow diagram conceptually illustrating transaction processing according to one embodiment of the present invention. In this example, at step 610, a transaction is received. A determination is subsequently made at step 620 based upon the transaction type whether or not to perform address translation. If the transaction is an inbound transaction (e.g., one received from the AGP bus 330), then transaction processing continues with step 630. Otherwise, if the transaction is an outbound transaction (e.g., one received from the one or more I/O ports 412), then processing continues with step 640. At step 630, translation processing is performed. While for convenience, GART entries may be speculatively fetched from the SRAM 410, not all inbound transactions are translated. For example, inbound transactions specifying a virtual address outside of the AGP range (e.g., the GART aperture) will not be translated. At step 640, outbound transactions bypass the translation processing. Finally, at step 650, the transaction is executed on the appropriate bus (e.g., inbound transactions are executed on one or more of the I/O ports 412 and outbound transactions are executed on the AGP bus 330).

Inbound PCI Write Transaction Processing

Preferably as shown in FIG. 5B, the GXB 410 is configured to process both AGP transactions and PCI transactions (e.g., AGP transactions with PCI semantics) received on the AGP bus 330 to provide a level of backwards compatibility. The processing flow through the GXB 410 is very similar for each of the PCI, low priority AGP, and high priority AGP stream. Therefore, only the processing of an exemplary PCI transaction will be described herein.

Figure 7:
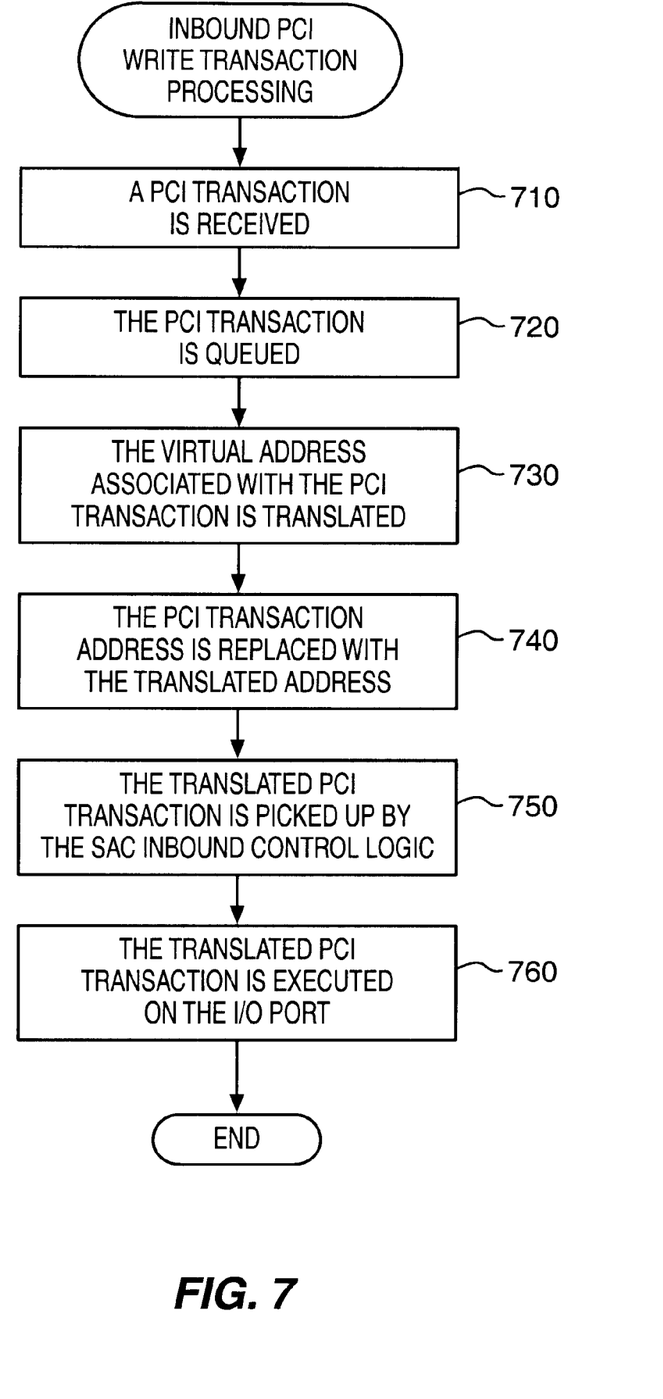
FIG. 7 is a flow diagram illustrating inbound PCI write transaction processing according to one embodiment of the present invention.

FIG. 7 is a flow diagram illustrating inbound PCI write transaction processing according to one embodiment of the present invention. In the example depicted, at step 710, a PCI cycle runs on the AGP bus 330 delivering the PCI transaction to the GXB 410 followed by the data associated with the PCI transaction. At step 720, the PCI transaction is buffered in the PCI inbound buffer 570. Upon winning arbitration, the virtual address associated with the PCI transaction is translated to a physical address in main memory 325 as described further below (step 730). The PCI transaction's virtual address is overwritten with the translated address at step 740. Due to the speculative nature of the retrieval of GART entries, when translation is not to be performed, the translated address may be the same as the virtual address. At any rate, the translated PCI transaction is buffered in the SAC inbound buffer 580 at step 750 until the transaction can be executed on the appropriate I/O port 412. Finally, the translated PCI transaction is performed by executing a write cycle on the I/O port 412.

Outbound PCI Write Transaction Processing

Figure 8:
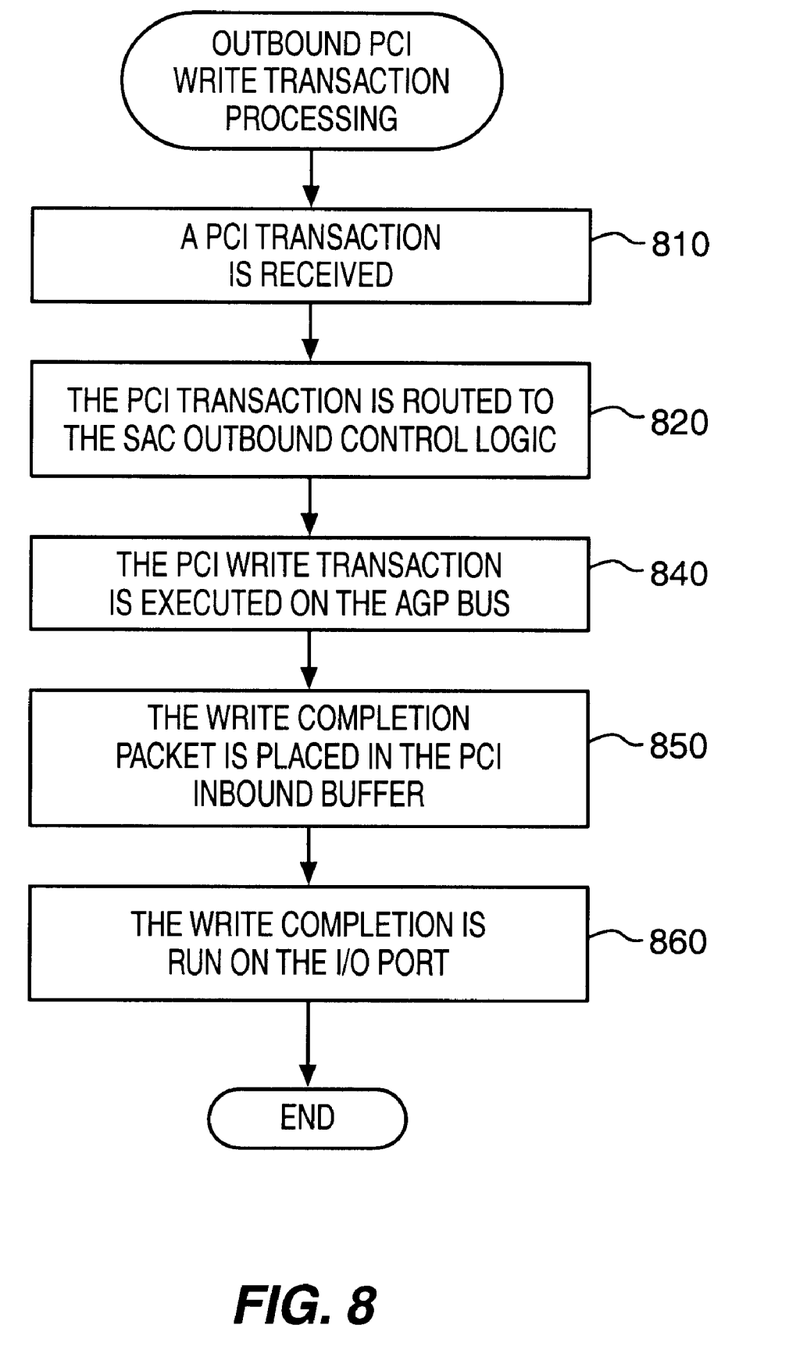
FIG. 8 is a flow diagram illustrating outbound PCI write transaction processing according to one embodiment of the present invention.

As described above, outbound transactions need not be translated by the GXB 410. To further illustrate this, processing associated with an outbound PCI write transaction will now be described with reference to FIG. 8. According to this example, a write request is executed on an I/O port 412 and a PCI request is received and routed to the SAC outbound control logic 585 (steps 810 and 820). Data associated with the PCI request is transferred to the data buffer unit 510. At step 840, upon winning an arbitration time slot, the outbound PCI write transaction is performed by executing a write cycle on the AGP bus 330. A write completion indication may be provided after the outbound PCI write transaction has been completed successfully (steps 850 and 860).

Address Translation Overview

Figure 9:
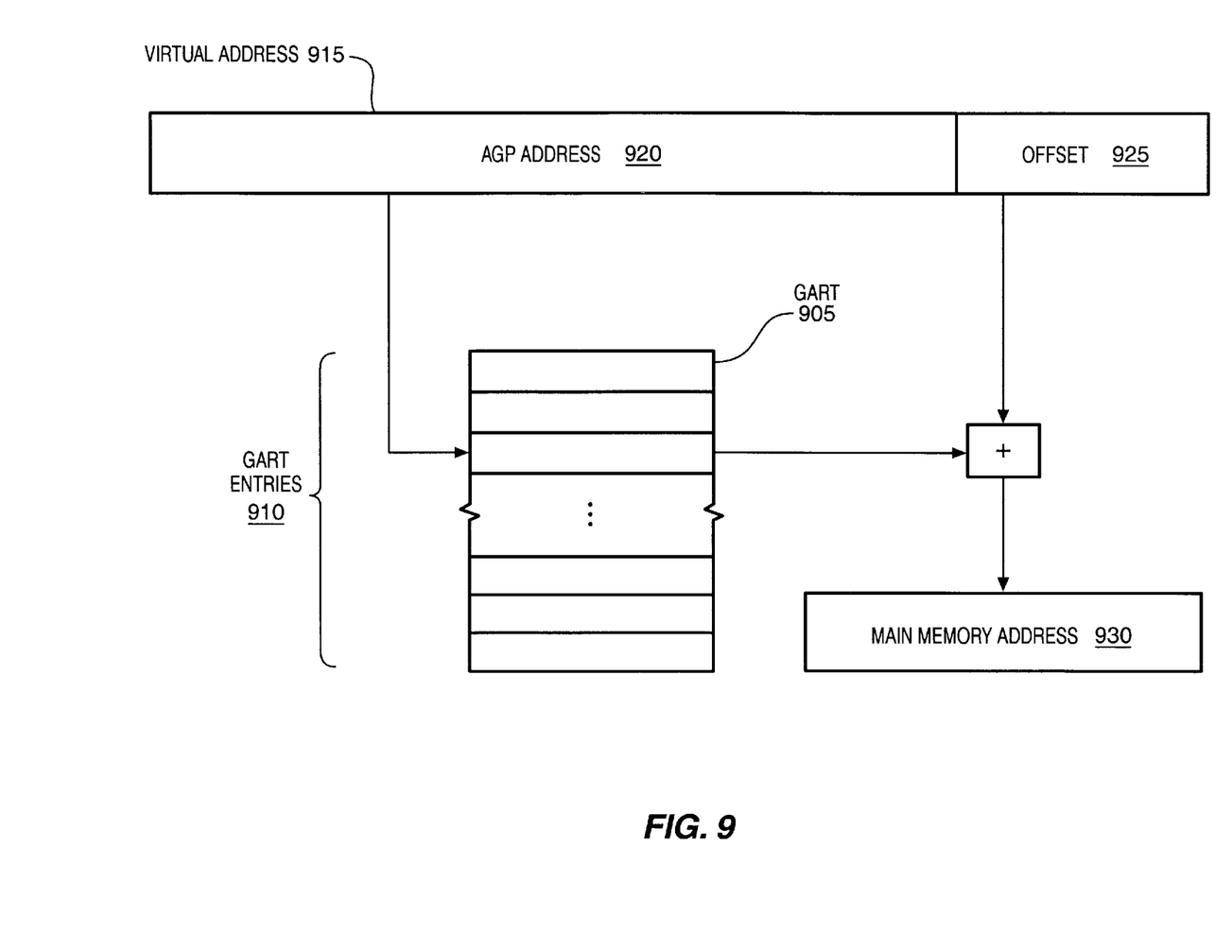
FIG. 9 conceptually illustrates graphics (virtual) to physical address space translation according to one embodiment of the present invention.

FIG. 9 conceptually illustrates graphics (virtual) to physical address space translation according to one embodiment of the present invention. Briefly, in this example, a virtual address 915 comprises an AGP address 920 and an offset 925. The virtual address 915 represents an address in the continuous logical address space employed by the graphics accelerator 335, for example. The AGP address 920, a portion thereof, or other information derived from the AGP address 920 is used to retrieve an appropriate entry from the GART 905. Information contained within the GART entry identifies a physical page in main memory 325 containing the physical address corresponding to the virtual address 915. The physical page identified by the GART entry is combined with the offset 925 from the virtual address 915 to form the main memory address 930.

Support for Multiple Page Sizes

According to one embodiment, the GXB 410 supports two different page sizes in main memory 325. The translation of the virtual address 915 depends upon the page size in which the corresponding physical address resides. In one embodiment, a fixed page size (e.g., 4 Kbyte or 4 Mbyte) is used for all pages falling within the GART aperture and an indication of the page size is stored in a control register in the GXB 410 during system boot. Currently, the AGP programming model is designed using 4 Kbyte pages for GART entries. By allowing a larger page size (e.g., 2 Mbyte, 4 Mbyte, etc.), the GXB 410 is compatible with high performance computer systems.

While, above, all pages in the GART aperture are one size or another, in an alternative embodiment, the GART aperture may concurrently include pages of differing sizes. In this embodiment, the address translation needs to be dynamically controlled as described below.

Figure 10A:
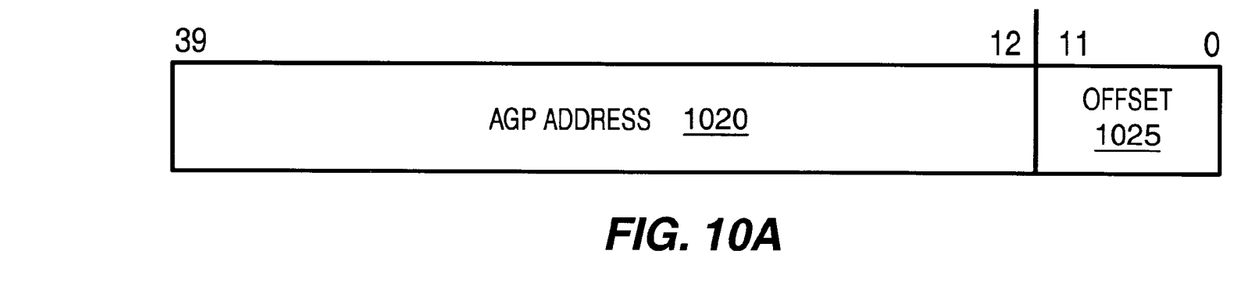
FIG. 10A illustrates an exemplary virtual address format which may be employed to refer to data residing in 4 Kbyte pages in main memory.

FIG. 10A illustrates an exemplary virtual address format which may be employed to refer to data residing in 4 Kbyte pages in main memory. According to this embodiment, the virtual address 915 is 40 bits wide. The AGP address 1020 comprises 28 bits and the offset 1025 comprises 12 bits.

Figure 10B:
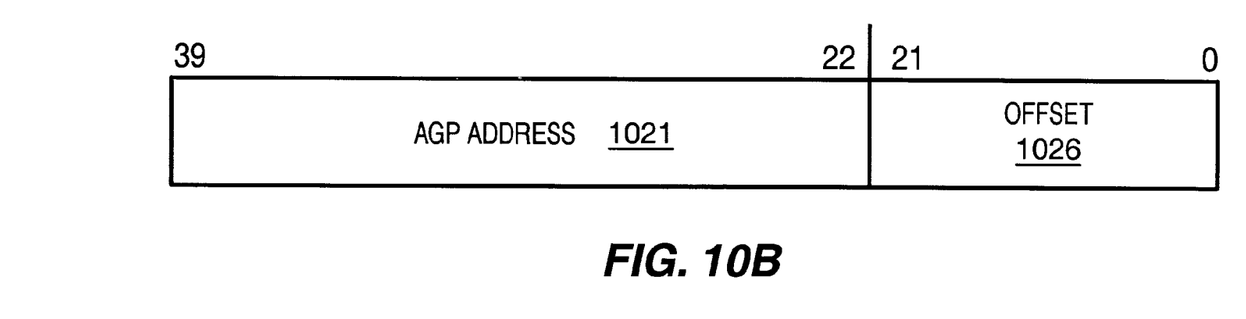
FIG. 10B illustrates an exemplary virtual address format which may be employed to refer to data residing in 4 Mbyte pages in main memory.

FIG. 10B illustrates an exemplary virtual address format which may be employed to refer to data residing in 4 Mbyte pages in main memory. According to this embodiment, the virtual address 915 is again 40 bits wide. However, the AGP address 1021 is reduced to 18 bits and the offset 1025 is increased to 22 bits. It is contemplated that various other page sizes could be accommodated.

Figure 11A:
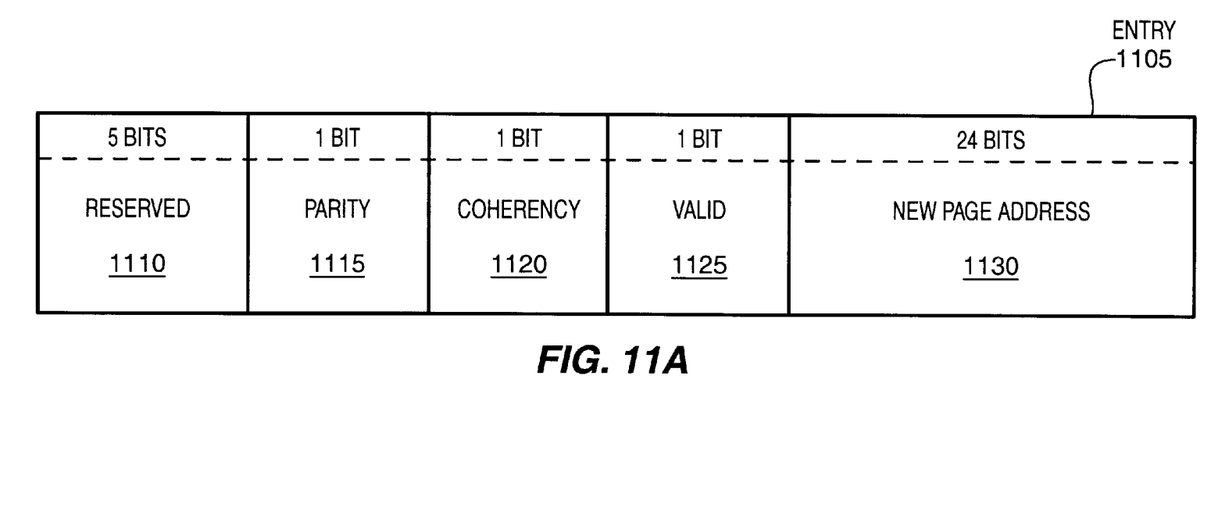
FIG. 11A illustrates an exemplary GART entry format to support address translation to 4 Kbyte pages in main memory.

FIG. 11A illustrates an exemplary GART entry format 1105 to support address translation to 4 Kbyte pages in main memory. In this example, the entry 1105 is 32 bits wide and includes a parity bit 1115, a coherency bit 1120, a valid bit 1125, a new page address 1130, and a reserved area 1110. Each entry covers one 4 Kbyte page. One megabyte is sufficient to hold 256 k entries or a total of 1 GB of translatable space for 4 Kbyte pages.

The parity bit 1115 covers the entire GART entry 1105. It may be generated by hardware and be calculated such that the total number of 1's, including the parity bit 1115 total to an even or an odd number.

The coherency bit 1120 indicates whether or not the traffic from the graphics card needs to be coherent with the system bus 315. Coherency is discussed further below.

The valid bit 1125 indicates whether of not the SRAM 405 contains valid data for this entry. If the valid bit 1125 indicates the data is valid for the entry, then it is ok to use the entry for address translation.

In this example, the new page address 1130 is 24 bits wide. The new page address 1130 comprises a start address of a 4 Kbyte physical page in main memory 325 that contains the desired physical address.

Figure 11B:
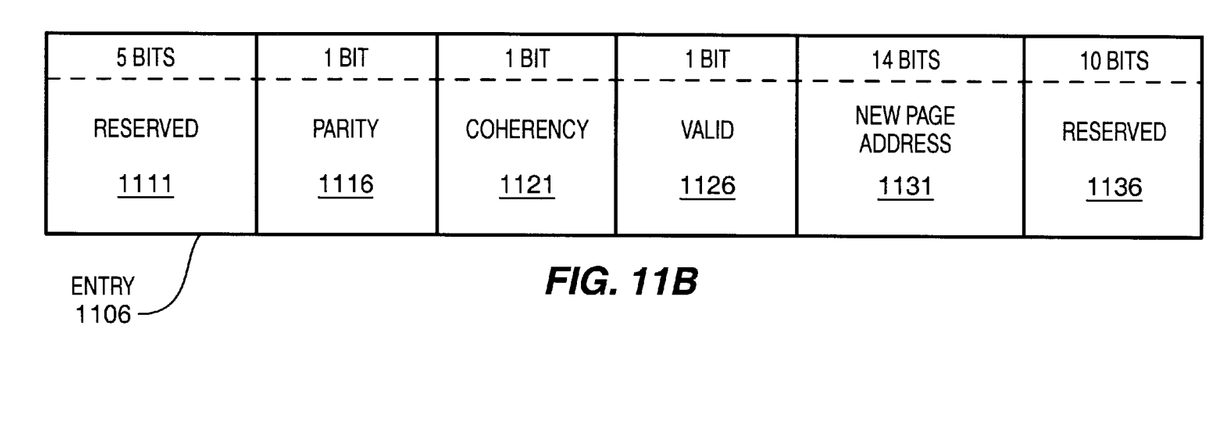
FIG. 11B illustrates an exemplary GART entry format to support address translation to 4 Mbyte pages in main memory.

FIG. 11B illustrates an exemplary GART entry format to support address translation to 4 Mbyte pages in main memory. In this example, as above, the entry 1106 is 32 bits wide and includes a parity bit 1116, a coherency bit 1121, a valid bit 1126, a new page address 1131, and reserved areas 1111 and 1136. Each entry covers one 4 Mbyte page.

As above, the parity bit 1116 covers the entire GART entry 1106 and may be calculated such that the total number of 1's, including the parity bit 1116 total to an even or an odd number.

The coherency bit 1121 indicates whether or not the traffic from the graphics card needs to be coherent with the system bus 315. Coherency is discussed further below.

The valid bit 1126 indicates whether of not the SRAM 405 contains valid data for entry in question. If the valid bit 1126 indicates the data is valid for the entry, then it is ok to use the entry for address translation.

In this example, the new page address 1131 is 14 bits wide. The new page address 1131 comprises a start address of a 4 Mbyte physical page in main memory 325 that contains the desired physical address.

In alternative embodiments, the relative positioning of the bits and fields may be different than that illustrated in the examples of FIG. 11A and FIG. 11B. Also, in alternative embodiments, the entry format may also include a page mode bit to indicate the destination page size (e.g., 4 Kbyte or 4 Mbyte) and provide for dynamic control of the address translation process. In this manner, more than one different page size may be concurrently supported.

Coherency

Traffic from the graphics card (e.g., graphics accelerator 335) may or may not want to be coherent with the system bus 325. According to one embodiment, coherency is selectable on a page-by-page basis. For purposes of this disclosure, "coherency" means that the addresses will appear on the system bus 325 so that the one or more processors 305 and 310 may snoop their caches for that address. If the texture map or other image data is marked write combining (WC) by the processor, then that data is not coherent. Addresses on the system bus 325 which hit in a processor's WC buffer are not snooped. Alternatively, the application may know that the data in main memory 325 was not used by the processor (e.g., it came from disk) and wants the graphics card to fetch the data without using system bus 325 bandwidth, so forces the access to be non-coherent.

As described above, for all AGP-type accesses which hit in the AGP range, there is a bit per GART entry which determines whether the address is coherent. For AGP-type accesses outside the AGP range, information (e.g., a one bit coherency indicator) may be read from a configuration register of the GXB 410 to determine the coherency. Importantly, coherency or non-coherency applies to access using the AGP protocol only. Accesses using the PCI protocol are always done coherently, whether they hit the translation table or not.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A graphics expansion bridge comprising:
   a first interface unit to be coupled to a system memory and I/O controller through one or more I/O ports, the first interface unit enabling data transfers over the one or more I/O ports to or from a main memory of a computer system;
   an Accelerated Graphics Port (AGP) interface unit that provides bus control signals and addresses to enable data transfers over an AGP bus to or from a peripheral device; and
   an address translation unit coupled to the first interface unit and the AGP interface unit, the address translation unit to translate graphics addresses associated with inbound AGP transactions received on the AGP bus by accessing static random access memory (SRAM) containing a graphics address relocation table (GART) in its entirety, the GART including physical addresses of pages in a main memory of the computer system.

2. The graphics expansion bridge of claim 1, wherein the GART includes a plurality of entries each associated with a page in main memory and including an indication identifying whether or not addresses within the page are to be snooped on a processor bus of the computer system.

3. The graphics expansion bridge of claim 1, wherein the address translation unit supports multiple page sizes by interpreting entries in the GART according to a first format or a second format.

4. The graphics expansion bridge of claim 3, wherein the multiple page sizes include two or more of 4 Kbyte pages, 2 Mbyte pages, and 4 Mbyte pages.

5. The graphics expansion bridge of claim 3, wherein the multiple page sizes include 4 Kbyte and 4 Mbyte.

6. A chipset comprising:

a graphics expansion bridge to provide a bus protocol bridging between one or more input/output (I/O) ports and an Accelerated Graphics Port (AGP) bus, the graphics expansion bridge to translate virtual addresses associated with inbound transactions to physical addresses within a main memory of a computer system based upon a graphics address relocation table (GART) stored entirely in a local memory; and a system memory and I/O controller coupled to the graphics expansion bridge and configured to be coupled to a system bus and a memory bus of the computer system, the system memory and I/O controller to perform data transfers to and from the main memory on behalf of the graphics expansion bridge.

7. The chipset of claim 6, wherein the local memory comprises an on-chip or off-chip static random access memory (SRAM).

8. The chipset of claim 6, wherein the GART includes a plurality of entries each associated with a page in main memory and including an indication identifying whether or not addresses within the page are to be snooped on a processor bus of the computer.

9. A method of translating input/output (I/O) transactions in a bridge, the method comprising:

receiving at the bridge an I/O transaction on a local I/O bus;

determining an address and an offset associated with the I/O transaction;

retrieving an entry from an address translation table based upon the address, the address translation table stored entirely in a local memory coupled directly to the bridge; and forming a physical address that identifies a location in a main memory of a computer system based upon the entry and the offset.

10. The method of claim 9, wherein the local I/O bus comprises an Accelerated Graphics Port (AGP) bus, and wherein the bridge receiving an I/O transaction on a local I/O bus comprises the bridge receiving an AGP transaction on the AGP bus.

11. The method of claim 10, wherein the address translation table comprises a graphics address relocation table (GART).

12. The method of claim 9, wherein the method further includes determining whether access to the physical address is to be coherent or non-coherent.

13. The method of claim 9, wherein the local memory comprises static random access memory (SRAM).

14. The method of claim 9, wherein the method further includes:

determining whether the location resides within a 4 Kbyte page or a 4 Mbyte page in the main memory; and interpreting the entry based upon the results of said determining.

15. A method of translating input/output (I/O) transactions in a bridge, the method comprising the steps of:

a step for receiving at the bridge an I/O transaction on a local I/O bus;

a step for determining an address and an offset associated with the I/O transaction;

a step for receiving an entry from an address translation table based upon the address, the address translation table stored entirely in a local memory coupled directly to the bridge; and a step for forming a physical address that identifies a location in a main memory of a computer based system based upon the entry and the offset.

16. The method of claim 15, wherein the local I/O bus comprises an Accelerated Graphics Port (AGP) bus, and wherein the step for receiving at the bridge an I/O transaction on a local I/O bus comprises the bridge receiving an AGP transaction on the AGP bus.

17. The method of claim 16, wherein the method further includes the steps of:

a step for determining whether the location resides within a 4 Kbyte page or a 4 Mbyte page in the main memory; and a step for interpreting the entry based upon the results of said determining step.

18. The method of claim 15, wherein the local memory comprises static random access memory (SRAM).

* * * * *